United States Patent [19]

Shapley

[11] 3,950,786
[45] Apr. 13, 1976

[54] MAGNETIC TAPE CASSETTE WITH SLIDING DOOR TO INHIBIT RECORDING

[75] Inventor: Bruce D. Shapley, Cupertino, Calif.

[73] Assignee: K/Tronic, Inc., Santa Clara, Calif.

[22] Filed: Feb. 7, 1975

[21] Appl. No.: 547,770

[52] U.S. Cl. .............................. 360/132; 360/60
[51] Int. Cl.² ................ G11B 15/04; G11B 23/04
[58] Field of Search ............... 360/132, 60, 96, 93; 242/15, 19 A, 197–199

[56] References Cited
UNITED STATES PATENTS

| | | | |
|---|---|---|---|
| 3,686,470 | 8/1972 | Stahlberg et al. | 360/132 |
| 3,721,772 | 3/1973 | Miura et al. | 360/132 |
| 3,766,327 | 10/1973 | Johnson et al. | 360/96 |
| 3,828,363 | 8/1974 | Somers | 360/60 |
| 3,848,265 | 11/1974 | Biery | 360/60 |

*Primary Examiner*—Alfred H. Eddleman

[57] ABSTRACT

A magnetic tape cassette is described in which there is provided a cavity in a rear wall of the cassette body for receiving a cavity sensing mechanism mounted internally in a cassette recording apparatus. The mechanism serves to enable and inhibit recording circuits in the apparatus as a function of its access to the cavity. A sliding door having at least two positions is provided to selectively open and close the cavity to the sensing mechanism to thereby provide control over the recording functions of the apparatus.

6 Claims, 11 Drawing Figures

MAGNETIC TAPE CASSETTE WITH SLIDING DOOR TO INHIBIT RECORDING

BACKGROUND OF THE INVENTION

The present invention relates in general to magnetic tape cassettes and, more particularly, to a novel cassette having a structure including an improved means for selectively controlling the erase and record functions of a recording apparatus in which it is employed.

Frequently, after information has been recorded on a cassette tape, it is necessary or otherwise desirable to insure that the recorded material is preserved and will not be lost or destroyed in an inadvertent erasure or an inadvertent recording over of the pre-recorded material during a subsequent play-back or other processing of the tape. As a consequence, to preserve important recordings, cassette recorders and other tape processing equipment from the outset have been provided with an internal mechanism for sensing the presence of a cavity in a cassette which, when present, serves to inhibit the erase and recording functions of the apparatus. This inhibiting action occurs notwithstanding that the external and other controls on the apparatus are properly set to perform the function.

In the fabrication of a cassette, which generally involves molding the majority, if not all of the parts, the aforementioned cavity is molded in a wall of the cassette body member. To permit an initial recording of the cassette, a removable chip of the material used in molding the body member is molded also in a position to block access to the cavity. By so closing off the cavity, the recording circuits in the recording apparatus are prevented from being inhibited by the sensing mechanism, and the cassette tape may be recorded. Thereafter, if it is desired to preserve the material recorded on the tape, the chip is simply removed, opening the cavity to the cavity sensing mechanism.

If, subsequently, the necessity for preserving the recorded material ceases to exist and it is desired that the cassette be used again for the recording of fresh material, some means or other must be used for closing the cavity to the sensing mechanism.

Heretofore, various methods and apparatus have been proposed and used for this purpose. In some cases, masking, cellophane and other similar types of tape have been employed. When so used, the tape is simply placed over the entrance to the cavity and stuck to the sides of the cassette body. In other cases, removable plugs have been employed to fill the cavity.

In either instance, these prior known methods and means for closing the cavity have proved to be less than satisfactory. In the use of tape to close the cavity, there remains the possibility that the tape will loosen and fall into the recording apparatus or otherwise foul and interfere with its operation. Additionally, tape is subject to being perforated by the sensing mechanism. Should this occur during the making of an important recording, the resulting activation of the sensing mechanism and inhibiting of the recording circuits could result in the loss of important information. In such a situation, for example, an operator conducting the recording might be totally unaware that the tape has been perforated and that the recording circuits have been inhibited.

In contrast, when plugs are used to close the cavity, many of the disadvantages of using tape are avoided. On the other hand, however, plugs are easily lost or misplaced and, in time, may also become loose fitting and drop from a cavity into the interior of a recording apparatus without the knowledge of the operator. As with perforated tape, such an occurrence would result in an undesired inhibiting of the recording circuits and could lead, as with tape, to fouling of the equipment.

SUMMARY OF THE INVENTION

In light of the foregoing, a principal object of the present invention is an improved magnetic tape cassette, comprising, as an integral part thereof, a means for reducing the possibility of an inadvertent erasure and recording-over of pre-recorded magnetic tape in the cassette.

In accordance with this object, there is provided a novel means for selectively opening and closing a cavity in a cassette which avoids certain of the disadvantages of the prior known methods and apparatus.

As described in detail hereinafter, there is provided for use in selectively controlling the erase and record functions of a magnetic tape cassette recording apparatus a sliding member in the nature of a door. The door is provided for closing and opening access to the cavity, which is located in a rear wall of the cassette.

In the embodiment described, the door is provided with a first boss or raised portion which releasably engages a plurality of indentations in the cassette body for releasably holding the door in either one of two positions to permit selective and reliable closing and opening of the cavity. A second boss is provided on the door for engagement by a fingernail or the like to effect the opening and closing of the door. With the door in a closed position, recording is enabled. With the door in an open position, recording is inhibited. In this manner, the recording function of the apparatus is effectively and reliably controlled.

A DESCRIPTION OF THE DRAWINGS

The above and other objects, features and advantages of the present invention will be apparent from the detailed description of the invention and the accompanying drawing in which.

DETAILED DESCRIPTION

Figure 1:
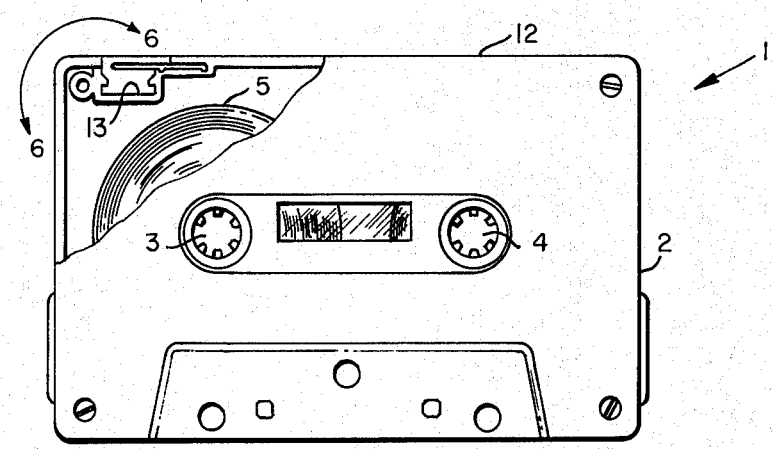
FIG. 1 is a partially broken-away plan view of a cassette incorporating features of the present invention.
Figure 2:
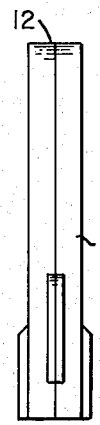
FIGS. 2–5 are right, left, front and rear-edge views of the cassette of FIG. 1.
Figure 3:
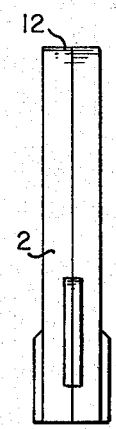
Figure 4:
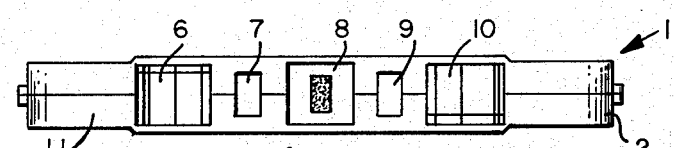
Figure 5:
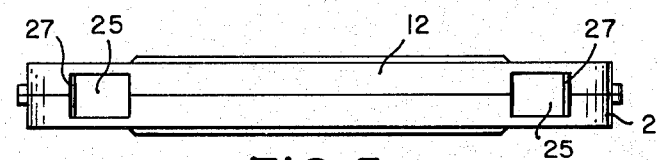
Figure 6:
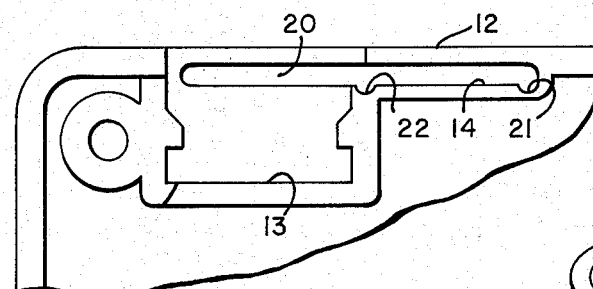
FIG. 6 is an enlarged partial plan view taken within lines 6—6 of FIG. 1 with the sliding door omitted for clarity.
Figure 7:
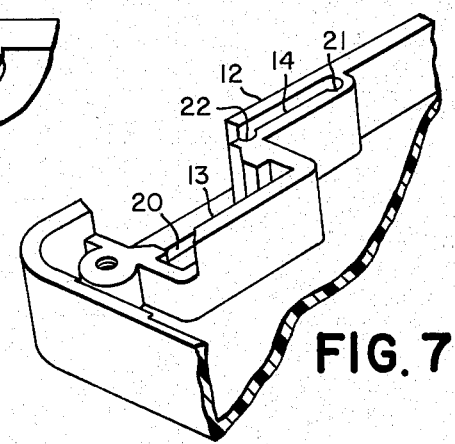
FIG. 7 is a pictorial view of the cassette portion shown in FIG. 6.

Referring to the drawings, there is shown a cassette 1 comprising a body member 2 enclosing a pair of reels 3 and 4 containing a supply of magnetic tape 5. In a forward or front wall 11 of body member 2, there is provided a plurality of ports 6, 7, 8, 9 and 10. Ports 6–10 are provided for receiving tape head, idler and drive rollers and other elements (not shown) internal to a recording apparatus as is required in the recording and playback of signals on the tape 5. These features of the cassette 1, including their construction and operation are conventional and well known. COnsequently they are not further described.

In a rear wall 12 of body member 2, there is provided in accordance with the present invention a pair of adjacent cavities 13 and 14, as shown in more detail in FIGS. 6–11.

Referring to FIGS. 6–11, cavity 13 extends from wall 12 inwardly for a predetermined distance. The actual extent of the distance is determined by the requirements of a cavity sensing mechanism used in the cassette recording apparatus for contolling the erase and recording functions of the apparatus with which a cassette as herein described is used. Extending normal to the mouth of cavity 13 is a second cavity 14. Cavity 14 is located in the wall 12 or immediately interior thereof for receiving, in sliding relationship, a door member 25, as will be described with respect to FIGS. 8 and 9.

In one wall of cavity 14, extending parallel to the longitudinal axis of wall 12, there is provided a recess 20. Recess 20 extends through cavity 14 and into cavity 13 for providing a track for door member 25. Normal to recess 20 and spaced apart in another wall of cavity 14 is a pair of recesses or indentations 21 and 22. As will be apparent, indentations 21 and 22 are provided for releasably receiving a corresponding raised portion or boss 26, which is provided at one end of and extending from the surface of the door member 25.

Figure 8:
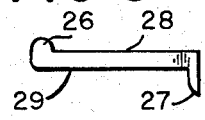
FIGS. 8–9 are enlarged plan and elevation views of a sliding door in accordance with the present invention as shown in the broken-away portion of FIG. 1.
Figure 9:
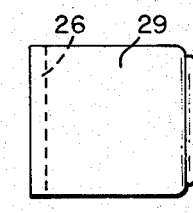
Figure 10:
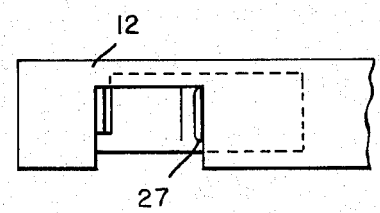
FIG. 10 is a rear elevation view of the cassette of FIG. 1 with the door of FIG. 9 in a full open position.
Figure 11:
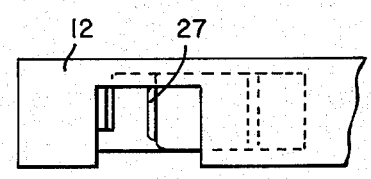
FIG. 11 is a rear elevation view of the cassette of FIG. 1 with the door of FIG. 9 in a half-open position.

Referring to FIGS. 8 and 9, door member 25 comprises essentially a flat rectangular member having an inner wall surface 28 and an outer wall surface 29. The boss 26, previously described, is provided to extend inwardly from one end of the inner surface 28. A second boss, or raised portion, 27 is provided to extend outwardly from an opposite end of the outer wall surface 29. When installed in cavity 14, boss 26 serves as a means for releasably retaining door member 25 in either a closed or an open position by releasably engaging indentations 22 and 21 respectively. Boss 27, on the other hand, serves as a fingernail grip for sliding the door member 25 between said open and closed positions.

While described with respect to a single preferred embodiment, it is understood that various modifications and changes may occur to those skilled in the art which are within the spirit and scope of the present invention. It is, therefore, contemplated that the present invention will not be restricted to the features illustrated, but only as hereinafter claimed and the equivalents thereof.

What is claimed is:

1. In a magnetic tape cassette, said cassette having a rear wall in which is provided a first cavity for receiving a recording control element mounted internally in a magnetic tape recording apparatus, the improvement comprising:

means forming a second cavity in said rear wall, said second cavity being entirely enclosed except for an opening at an edge of said first cavity; and a movable member slidably mounted in said second cavity and movable between a first and a second position through said opening for covering said first cavity.

2. The improvement according to claim 1 wherein said movable member comprises a raised member forming a fingernail-gripping means which extends outwardly from one end of said movable member, and further comprising means for releasably retaining said movable member in either of said first and said second positions.

3. The improvement according to claim 2 wherein said retaining means comprises an engaging means on said movable member and a first and a second recess in spaced positions in a wall of said second cavity, corresponding to said first and said second positions, for releasably receiving said engaging means so that, when said engaging means is engaged in either of said recesses, said movable member is restrained from sliding until a predetermined force is applied thereto.

4. A cassette according to claim 1 wherein said movable member and said second cavity include a means for releasably retaining said movable member in said first and said second position.

5. A cassette according to claim 4 wherein said retaining means comprises a first and a second means which releasably engage when said movable member is in said first and said second position.

6. A cassette according to claim 5 wherein said first means comprises a raised portion on said movable member; and said second means comprises a first and a second indentation in the wall of said second cavity for releasably receiving said raised portion when said movable member is in said first and said second positions.

* * * * *